US011301909B2

(12) United States Patent
Srivastava et al.

(10) Patent No.: US 11,301,909 B2
(45) Date of Patent: Apr. 12, 2022

(54) ASSIGNING BIAS RATINGS TO SERVICES

(71) Applicant: International Business Machines Corporation, Armonk, NY (US)

(72) Inventors: Biplav Srivastava, Rye, NY (US); Francesca Rossi, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 806 days.

(21) Appl. No.: 15/986,093

(22) Filed: May 22, 2018

(65) Prior Publication Data

US 2019/0362396 A1 Nov. 28, 2019

(51) Int. Cl.
*G06Q 30/02* (2012.01)
*G06Q 50/10* (2012.01)
*G06F 40/58* (2020.01)

(52) U.S. Cl.
CPC ......... *G06Q 30/0282* (2013.01); *G06F 40/58* (2020.01); *G06Q 50/10* (2013.01)

(58) Field of Classification Search
CPC ....... H04L 51/066; H04L 51/38; H04L 67/22; H04L 67/306; H04L 67/38; H04L 12/5692; H04L 29/12047; H04L 41/5003; H04L 45/00; H04L 45/04; H04L 45/302; H04L 61/15; H04L 12/10; H04L 25/45; H04L 27/22; H04L 67/42; H04L 9/0858
See application file for complete search history.

(56) References Cited

U.S. PATENT DOCUMENTS

| 7,752,502 B2 | 7/2010 | Glee et al. |
| 8,630,960 B2 | 1/2014 | Gross |
| 9,285,973 B1* | 3/2016 | Gable ............... G06Q 30/0282 |
| 10,497,012 B1* | 12/2019 | Majumder ......... G06Q 30/0641 |
| 2010/0076724 A1* | 3/2010 | Brown ................. G06Q 50/04 |
| | | 702/179 |

(Continued)

OTHER PUBLICATIONS

A. Howard, C. Zhang and E. Horvitz, "Addressing bias in machine learning algorithms: A pilot study on emotion recognition for intelligent systems," 2017 IEEE Workshop on Advanced Robotics and its Social Impacts (ARSO), 2017, pp. 1-7 (Year: 2017).*

(Continued)

*Primary Examiner* — Maria C Santos-Diaz
(74) *Attorney, Agent, or Firm* — Amin, Turocy & Watson, LLP

(57) ABSTRACT

Techniques are provided for assigning a bias rating to a service based on bias and/or anti-bias testing. For example, unbiased data can be input to the service to, e.g., determine whether the service introduces elements of bias. As another example, biased data can be input to the service to determine whether the service provides elements of anti-bias. In one example, a computer-implemented method comprises selecting, by a device operatively coupled to a processor, source data configured according to a bias specification indicating a criterion that defines bias. The computer-implemented method can comprise determining whether bias exists in output data of the service and determining a bias rating based on the determining whether bias exists in the output data. The computer-implemented method can further comprise assigning the bias rating to the service.

20 Claims, 10 Drawing Sheets

(56) References Cited

U.S. PATENT DOCUMENTS

| | | | | |
|---|---|---|---|---|
| 2012/0131386 | A1* | 5/2012 | Fournier | G06F 11/263 |
| | | | | 714/35 |
| 2013/0226820 | A1* | 8/2013 | Sedota, Jr. | G06Q 30/0282 |
| | | | | 705/319 |
| 2016/0086091 | A1 | 3/2016 | Ellis | |
| 2016/0269345 | A1 | 9/2016 | Weizman | |
| 2017/0017975 | A1* | 1/2017 | Sheppard | G06Q 30/0204 |
| 2017/0147682 | A1* | 5/2017 | Alaqeeli | G06F 40/194 |
| 2017/0249389 | A1* | 8/2017 | Brovinsky | G06F 16/9535 |
| 2017/0316123 | A1* | 11/2017 | Xu | G06Q 10/0639 |
| 2018/0255731 | A1* | 9/2018 | Gallo | A01H 6/542 |
| 2019/0043487 | A1* | 2/2019 | Rivkin | G10L 15/32 |
| 2019/0082224 | A1* | 3/2019 | Bradley | G06Q 30/0282 |
| 2019/0179861 | A1* | 6/2019 | Goldenstein | G06F 16/9535 |
| 2019/0265701 | A1* | 8/2019 | Troia | G06F 11/1012 |
| 2019/0349333 | A1* | 11/2019 | Pickover | G06N 5/02 |

OTHER PUBLICATIONS

M. Shepperd, D. Bowes and T. Hall, "Researcher Bias: The Use of Machine Learning in Software Defect Prediction," in IEEE Transactions on Software Engineering, vol. 40, No. 6, pp. 603-616, Jun. 1, 2014 (Year: 2014).*

Srivastava et al., "Towards Composable Bias Rating of AI Services," AAAI/ACM Conference of Artificial Intelligence, Ethics and Society (AIES), Feb. 2018.

Recasens et al., "Linguistic Models for Analyzing and Detecting Biased Language," Proceedings of the 51st Annual Meeting of the Association for Computational Linguistics, 2013, pp. 1650-1659, Association for Computational Linguistics, 10 pages.

Kuang et al., "Semantic and Context-aware Linguistic Model for Bias Detection," 6 pages Retrieved on May 15, 2018. https://pdfs.semanticscholar.org/c887/f316adb0052ae6c28ff60a8f8a17a1d7bf37.pdf.

"JUnit—Frequently Asked Questions," JUnit, 19 pages. Retrieved on May 15, 2018. https://junit.org/junit4/faq.html.

Galhotra et al., "Fairness Testing: Testing Software for Discrimination," 2017, Proceedings of the 2017 11th Joint Meeting on Foundations of Software Engineering, pp. 498-510, Association for Computing Machinery, 13 pages.

"Ethics Analysis of Predictive Algorithms: An Assessment Report for BC Safety Authority," Jul. 2017, 51 pages. Retrieved on May 15, 2018. https://genrblog.files.wordpress.com/2018/02/generation-r-report-for-technical-safety-bc.pdf.

"Bias of an estimator," Wikipedia, Wikimedia Foundation, Inc., 11 pages. Retrieved on May 15, 2018. https://en.wikipedia.org/wiki/Bias_of_an_estimator.

"List of cognitive biases," Wikipedia, Wikimedia Foundation, Inc., 19 pages. Retrieved on May 15, 2018. https://en.wikipedia.org/wiki/List_of_cognitive_biases.

Galliers et al., "Evaluating Natural Language Processing Systems," Technical Report 291, Mar. 1993, University of Cambridge Computer Laboratory, Cambridge, England, 188 pages.

King, "Evaluating Natural Language Processing Systems," Communications of the ACM, Jan. 1996, vol. 39, No. 1, pp. 73-79, 7 pages.

Papineni et al., "BLEU: a Method for Automatic Evaluation of Machine Translation," Proceedings of the 40th Annual Meeting of the Association for Computational Linguistics, Jul. 2002, pp. 311-318. Association for Computational Linguistics, 8 pages.

Herzig et al., "An Annotation Scheme for Automated Bias Detection in Wikipedia," Proceedings of the Fifth Law Workshop, 2011, pp. 47-55, Association for Computational Linguistics, 9 pages.

Massa et al., "Manypedia: Comparing Language Points of View of Wikipedia Communities," Proceedings of the Eighth Annual International Symposium on Wikis and Open Collaboration, Aug. 2012, No. 21, ACM, 9 pages.

Angwin et al., "Machine Bias," 2016, ProPublica, 17 pages. Retrieved on May 15, 2018. https://www.propublica.org/article/machine-bias-risk-assessments-in-criminal-sentencing.

* cited by examiner

ASSIGNING BIAS RATINGS TO SERVICES

BACKGROUND

The subject disclosure relates to techniques for testing services for the existence of bias and assigning a bias rating to those services as a result of the testing.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate synchronization of processing components for parallel deep learning are described.

According to an embodiment of the present invention, a system can comprise a memory that stores computer executable components and a processor that executes computer executable components stored in the memory. The computer executable components can comprise an input component that can input source data to a service being evaluated for bias. The source data can be configured according to a bias specification representing a criterion that defines bias. The computer executable components can comprise a bias testing component that can examine output data of the service. The output data can be generated based on input of the source data. Based on the examination of the output data, the bias testing component can make a determination of whether bias exists in the output data. The computer executable components can further comprise a rating component that can assign a bias rating to the service based on the determination of whether bias exists in the output data.

In some embodiments, elements described in connection with the system can be embodied in different forms such as a computer-implemented method, a computer program product, or another form.

DETAILED DESCRIPTION

Figure 1:
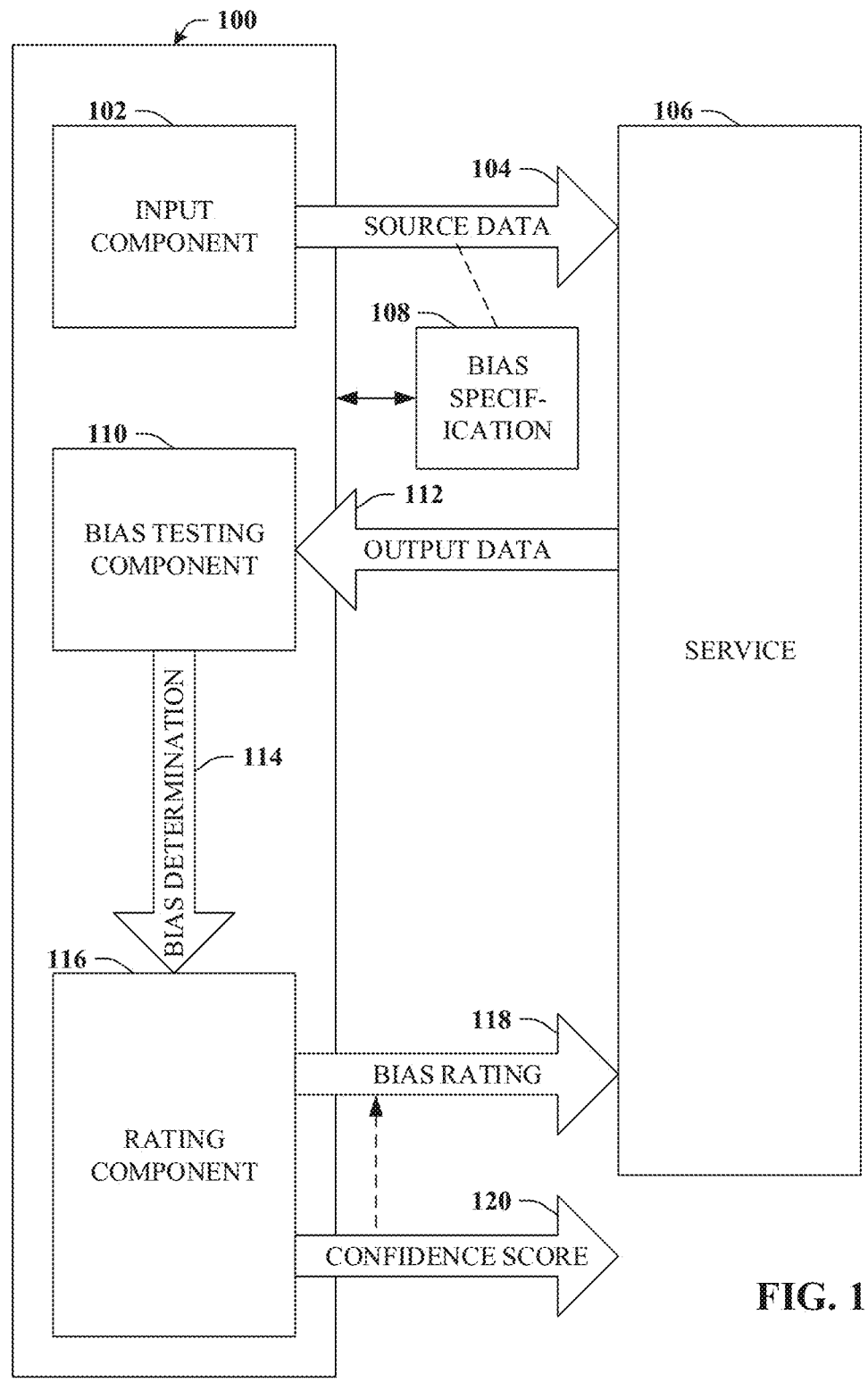
FIG. 1 illustrates a block diagram of an example, non-limiting system that can assign a bias rating to a service based on bias and/or anti-bias testing in accordance with one or more embodiments.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

There are many aspects of ethical behavior that are expected from a decision-making entity. Prominent among them are alignment to common norms, transparency, fairness, diversity, and interpretability. In particular, fairness refers to behavior that treats all elements of a certain class in the same way. A more precise term for fairness is bias. An ethical system fails to be ethical if it presents intended or accidental bias. Furthermore, ethical systems can fail or lose credibility if there is a perception of bias, even when none exists. Thus, in an ethical system, it is important to avoid behaving in a way that presents intended, perceived or accidental bias.

A new wave of decision-support systems are being built today using artificial intelligence (AI) services that draw insights from data (e.g., text and video) and incorporate them in human-in-the-loop assistance. However, just as there are expectations that humans be ethical, a similar expectation can exist for automated systems that increasingly get delegated to act on behalf of humans. A significant aspect of an ethical behavior is to avoid bias, whether intended or accidental, and to avoid the perception of bias as well. For example, bias occurs with respect to an attribute of an entity when the data distribution of that attribute is not representative of a distribution of that attribute in the natural phenomenon that one wants to model and reason about.

A potentially biased behavior of a service can be difficult to detect and handle if the AI service is merely being used and not developed from scratch, since in the former case the training data set is typically not available for bias testing. A popular approach to building software applications is to reuse existing capabilities exposed as a service or API. Software application developers who use service catalogues to identify which services to reuse for their own applications typically will not have access to training data sets. Given that service catalogues typically only indicate function and price, a software developer who wants to reuse a previously created service has little or no way of knowing whether his or her own application will exhibit bias or preventing such from occurring.

Hence, significant issues arise due to the fact that services, such as AI services, are being increasingly used to act on behalf of humans. If the AI services are biased in some way, then these AI services may be making biased decisions, recommending biased decisions, or presenting data or evidence in a biased manner Such can lead to a wide range of consequences that can be envisioned, which vary in terms of severity and immediacy. For example, when searching any one of several existing databases for images of engineers, the percentage of engineers having a particular biological attribute found in the results is much lower than the actual percentage of engineers that exist and have that particular biological attribute, suggesting bias. If these datasets are used to train a system that is intended to make decisions, or help humans make decisions, about engineers, that system might not treat different engineers in a fair way. As another example, consider that bias has been shown in many existing AI systems that are currently in use, even systems for which ethical behavior is a requirement. For instance, an algorithm used by judicial systems across the United States to predict which lawbreakers have a high probability of re-offending has been shown to be biased. The risk assessment output by that algorithm was relied upon by judges for discretionary decisions such as sentencing, bail, and other decisions having a high expectation of ethical treatment, while the algorithm itself appears to be overtly and demonstrably biased. Such could occur without any knowledge by the algorithm developers or the judges relying on the output. In fact, there might be an inherent presumption that, because the output is provided by a machine, no bias exists at all.

If the dataset used for training a system or service is available, then it can be relatively trivial to check whether the service is biased, and there are technical solutions that allow at least partially removal of bias. However, if relevant training data sets are not available, such as when the AI service is merely being used off-the-shelf by a consumer and not developed from scratch, potentially biased behavior of the service can be quite difficult to detect and handle. Moreover, since most services operate by making a decision (e.g., output) based on insights drawn from data (e.g., input), it can be instructive to consider that bias in the output may be indicative of a biased service, biased input, or both.

One or more embodiments can be employed not only as a mechanism for detecting the existence of bias in services, but can detect anti-bias and can further assign bias ratings to services. These ratings can signify a third-party ratings system or agency that can be independent of the service consumer and the service provider. Ratings can provide benefits to developers and consumers of AI services. For example, developers of certain services (e.g., AI services) can use the ratings to provide insight into their own training data sets or other aspects of the service. Consumers can make more informed decisions about which services to select for their own software application. Furthermore, service catalogues might be encouraged to list the bias ratings of offered services along with function, price, or other descriptive material about offered services.

In some embodiments, the disclosed subject matter can determine the bias rating based on a two-stage rating approach. In some embodiments, this two-stage approach can, inter alia, isolate whether a service is a source of detected bias. In other words, whether bias, if it exists, stems from the service itself or is an artifact of biased input. The disclosed subject matter can utilize comprehensive sets of both biased and unbiased data with customizable distributions to generate the bias rating. Thus, for example, during a first stage, unbiased data can be provided to the service and the resulting output analyzed. Should the output be biased, then it can be determined that said bias is introduced by the service, not the input data. A rating, which indicates the service is biased, can be assigned accordingly. Examples of such can include "BS" or "biased system" or any other suitable indicator that the service is biased.

In some embodiments, during a second stage, biased data (as opposed to unbiased data input in the first stage) can be input to the service and the resulting output analyzed. Should the output be biased, then it can be determined that the service perpetuates bias of the input to the output, but that the service itself is not necessarily biased. Another rating can be assigned, for instance "DSBS" or "data-sensitive biased system" that indicates the service follows the properties of the input data and/or perpetuates bias but is not necessarily a source of bias.

On the other hand, should the output during the second stage be unbiased, even though the input is known to be biased, the disclosed subject matter can, in some embodiments, assign still another rating indicating the service is anti-biased. In this case, the rating can be "UCS" or an "unbiased compensating system". A compensating system can be one in which the service is not a source of bias and can even correct for bias in the input. As used herein, a UCS rating can be referred to as compensating or correcting.

It is understood that other suitable ratings are contemplated that could rely on other scales or classifications. It is further understood that additional levels of granularity or detail can be provided with respect to any or all ratings. For example, each rating can have sub-level ratings that indicate, e.g., deviation (e.g., a sigma distance or count) from a mean average. However, the above example classification, with or without additional levels of granularity, can be employed to evaluate a service both for bias as well as anti-bias (e.g., compensating for bias). Such can be advantageous in view of popular mechanisms to develop services or applications. For example, a given application may rely on numerous existing services that are composed sequentially such that the output of a first service represents the input of a second service. By establishing a rating system that indicates not only the existence of bias, but also the potential to compensate for bias, a software developer can be afforded more choices in service selection while still mitigating bias in the output of his or her own application, which is further detailed below.

Turning now to the drawings, with initial reference to FIG. 1, a block diagram is illustrated of an example, non-limiting system 100 that can assign a bias rating to a service based on bias and/or anti-bias testing in accordance with one or more embodiments. In some embodiments, the bias rating can be directed not merely to determining whether bias exists, but also whether the service has a capacity to compensate for bias, referred to herein as "anti-bias". System 100 and/or the components of the system 100 can be employed to use hardware and/or software to solve problems that are highly technical in nature, that are not abstract, and that cannot be performed as a set of mental acts by a human. For example, certain aspects of the disclosed subject matter are, in some embodiments, directed to aiding in the construction of a machine that can emulate certain determinations made by humans. A machine constructed to emulate mental acts performed by a human cannot, by definition, be performed by a human. Other aspect of the disclosed subject matter, in some embodiments, operates in connection with elements that are assigned a particular task for the very reason that mental acts by a human directed to accomplishing that task are impossible or infeasible. Further, some processes of the disclosed subject matter can be performed by specialized computers for carrying out defined tasks related to data selection or analysis. System 100 and/or components of system 100 or other systems described herein, in some embodiments, can be employed to solve new problems that arise through advancements in technology, computer networks, the Internet, and the like. System 100, in some embodiments, can provide technical improvements to AI system such as, e.g., mitigating the existence of bias in AI systems.

System 100 can comprise a processor and a memory that stores executable instructions that, when executed by the processor, facilitate performance of operations. Examples of said processor and memory, as well as other suitable computer or computing-based elements, can be found with reference to FIG. 10, and can be used in connection with implementing one or more of the systems or components shown and described in connection with FIG. 1 or other figures disclosed herein.

In this example, system 100 can include input component 102. Input component 102 can be configured to input source data 104 to a service 106 being evaluated for bias and/or anti-bias. In some embodiments, source data 104 can be configured according to bias specification 108. Bias specification 108 can represent a criterion that defines bias.

System 100 can further include bias testing component 110. Bias testing component 110 can be configured to examine output data 112 of service 106 that is generated based on input of source data 104. In response to the analysis, bias testing component 110 can make bias determination 114. Bias determination 114 can be indicative of whether bias exists in output data 112. In some embodiments, bias testing component 110 can further determine whether anti-bias is detected with respect to service 106, which can also be determined based on whether bias exists in output data 112. Anti-bias can be characterized as compensating for bias.

In some embodiments, the determination (e.g., bias determination 114) of whether bias exists in output data 112 can be made based on a comparison of a distribution of attribute values of output data 112 to a baseline distribution representing a naturally occurring distribution of values for that attribute. For example, bias testing component 110 can determine output data 112 is unbiased based on a distribution of attribute values of the output data being representative of a baseline distribution. Conversely, bias testing component 110 can determine output data 112 is biased based on a distribution of attribute values of the output data that is not representative of the baseline distribution. In a similar way, bias determination 114 can also indicate whether service 106 provides anti-bias.

System 100 can further include rating component 116. Rating component 116 can be configured to assign bias rating 118 to service 106. Rating component 116 can assign bias rating 118 based on bias determination 114 of whether bias exists in output data 112. In some embodiments, rating component 116 can assign bias rating 118 to service 106 further based on whether anti-bias was detected. Regardless, in some embodiments, rating component 116 can assign to bias rating 118 a confidence score 120. Confidence score 120 can indicate a level of confidence that bias rating 118 is accurate.

Hence, in some embodiments, system 100 can test the behavior of service 106 with respect to bias and/or anti-bias and assign to service 106 bias rating 118 as a result. Service 106 can be substantially any type of computational or cognitive system such as an AI service or any other suitable type of service. Such services can be embodied as an API, a software application, or the like.

There are many examples of such services available to consumers today. For instance, consider a language translate that converts input (e.g., source data 104) in one language into output of a different language. Another similar example can be an image caption generation service that constructs a caption (e.g., output data 112) that describes a given image (e.g., source data 104). In both cases, it is possible that some degree of bias can be found in the output with regard to a given attribute (e.g., style of worship, biological or cultural classifications, ethnological classification, genetic classification, tribal classification, beliefs, culture, nationality) of an entity. Existence of such bias could lead to a loss of goodwill or other consequences should bias be perceived. As another example, consider a medical condition detector that suggests a medical condition (e.g., output data 112) in response to input of medical information (e.g., source data 104). Bias in this system with respect to any data attribute for an entity, could result in a failure to recognize certain conditions or to incorrectly eliminate other conditions. Either one of those outcomes could significantly contribute to a misdiagnosis.

For various reasons, it can be advantageous to reduce or mitigate the existence of bias in services or other computational systems. While there is a potential to overlook these issues, the importance of reducing bias in computational systems can only grow as these systems become increasingly cognitive and interact with, or are relied upon by, more and more people. It can also be important to provide assurances with respect to bias, since the mere perception of bias could be a significant hurdle for technology adoption.

Today, many services are available as off-the-shelf services in which training data is not available for analysis. Thus, one way to test for bias it to control the input and measure the output. To provide a concrete example, the remainder of this disclosure assumes a language translation service. However, it is understood that the disclosed subject matter could be applied to any suitable AI service or computational system. In that regard, consider a case in which service 106 is a translation service that is provided English-language input that the service translates to a second language. This translated output can be fed back into the translator to translate from the second language back to English. Since we assume training data is not available, the output of the service can be examined for bias (or anti-bias). In this case, both source data 104 and output data 112 are in English, as the final output, not the intermediate output in the second language is being tested for bias.

Thus, a given rating (e.g., bias rating 118) can indicate whether a service is biased, anti-biased, or otherwise. While not intended to be limiting, examples provided herein can be a UCS (unbiased, compensating system) rating, a DSBS (data-sensitive biased system) rating, a BS (biased system) rating, and so on. In some embodiments, a UCS rating, which can be referred to as "compensating" or "correcting", can represent a determination that the service being tested forces a baseline distribution among legal choices with respect to input. In some embodiments, a DSBS rating, which can be referred to as "perpetuating", can represent a determination that an output of the service being tested follows a distribution similar to the input. In some embodiments, a BS (biased system) rating can represent a determination that an output of the service being tested follows a distribution statistically different from the baseline distribution.

Figure 2:
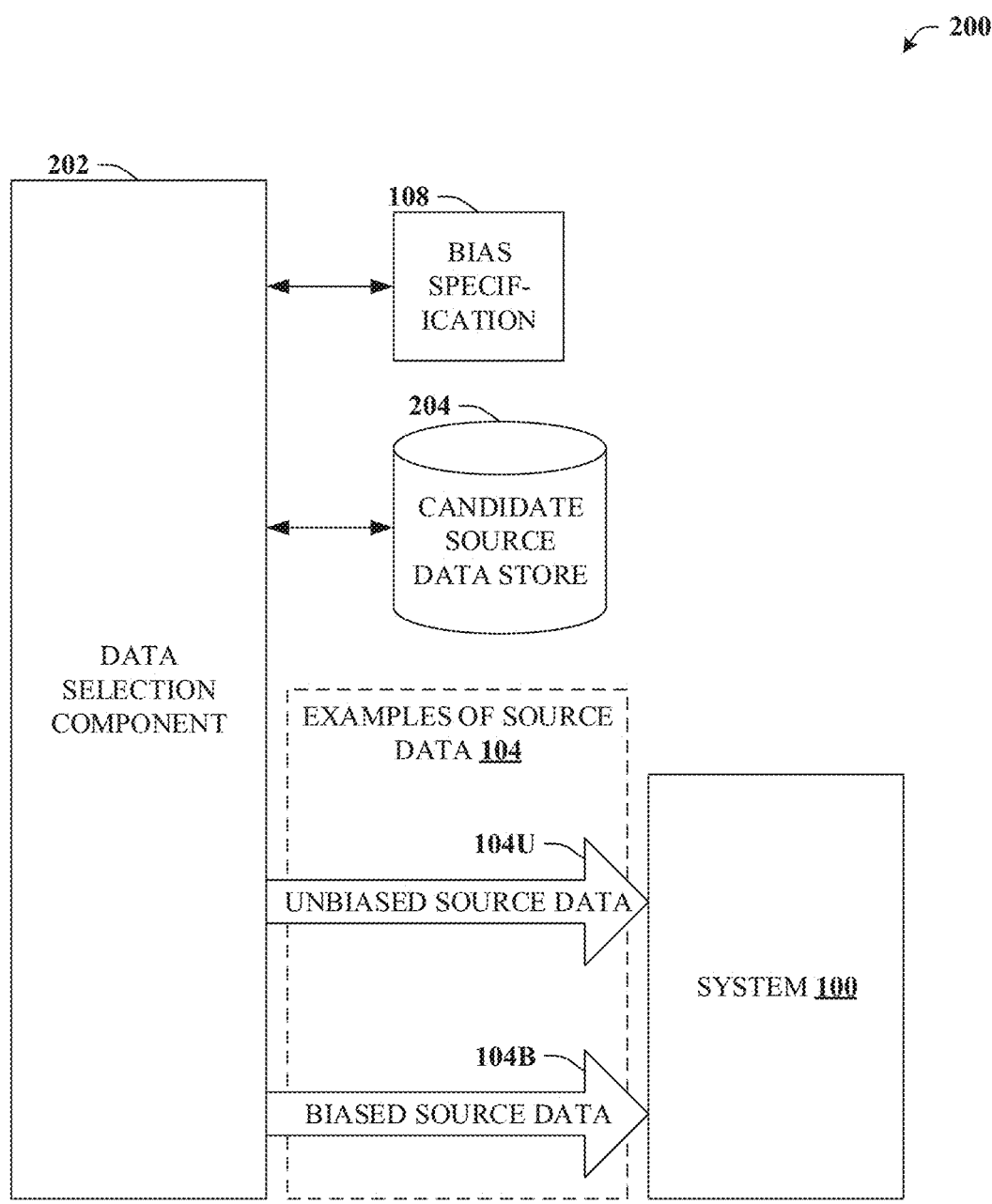
FIG. 2 illustrates a block diagram of an example, non-limiting system that can facilitate selection and/or generation of the source data, which is illustrated in additional detail, in accordance with one or more embodiments.

Turning now to FIG. 2, a block diagram of system 200 is illustrated. System 200 can facilitate selection and/or generation of the source data 104, which is illustrated in additional detail, in accordance with one or more embodiments. Repetitive description of like elements employed in other embodiments described herein is omitted for sake of brevity. In some embodiments, system 200 can include all or a portion of system 100. In some embodiments, system 200 can represent system 100 that is enhanced to include data selection component 202.

In some embodiments, data selection component 202 can be configured to select source data 104 based on bias specification 108. As one example, data selection component 202 can select source data 104 from candidate source data store 204. As another example, data selection component 202 can generate source data 104 from scratch based on bias specification 108. Regardless, source data 104 can be provided to input component 102 detailed in connection with FIG. 1.

Since bias specification 108 can define bias, in some embodiments, bias specification 108 can be promulgated or defined by a third party ratings entity, which may or may not be provided based on input from API producers or API consumers. In some embodiments, it can be assumed that any definition of bias included in bias specification 108 can depend only on a type of input (e.g., images, video, text, etc.) and not depend on tasks performed by the service being tested. As one example, bias specification 108 may declare that a distribution or proportion of actual particular human attributes in a particular region or field is 50/50 (which can represent, for example, percentage of humans having a first, defined biological classification versus a percentage of humans having a second, defined biological classification). Thus, when the distribution of values (indicative of the particular human attributes evaluated) in the output of a service is 50/50, then the output of the service can be deemed unbiased because the actual percentage matches with or is close to the distribution of values in the output of the service. Bias specification 108 might also declare that a distribution of values (indicative of the particular human attributes) of 20/80, 30/70, 40/60, 60/40, 70/30, and 80/20 are biased.

FIG. 2 further illustrates various examples of source data 104. For instance, in some embodiments, the source data 104 that is selected (e.g., selected from a repository or newly generated) by data selection component 202 can be unbiased according to bias specification 108. Such is represented by unbiased source data 104U. In some embodiments, unbiased source data 104U can be employed when testing service 106 for bias. As another example, in some embodiments, the source data 104 that is selected by data selection component 202 can be biased according to bias specification 108. Such is represented by biased source data 104B. In some embodiments, biased source data 104B can be employed when testing service 106 for anti-bias. As introduced above, rating component 116 can generate bias rating 118 according to a two-stage procedure. In some embodiments, the first stage can be employed to determine whether service 106 exhibits properties of bias and the second stage can be employed to determine whether the service 106 exhibits properties of anti-bias. As an example, bias rating 118 can result in response to unbiased source data 104U being input to service 106 during a first stage and biased source data 104B being input to service 106 during a second stage, which is further detailed in connection with FIGS. 3 and 4.

Figure 3:
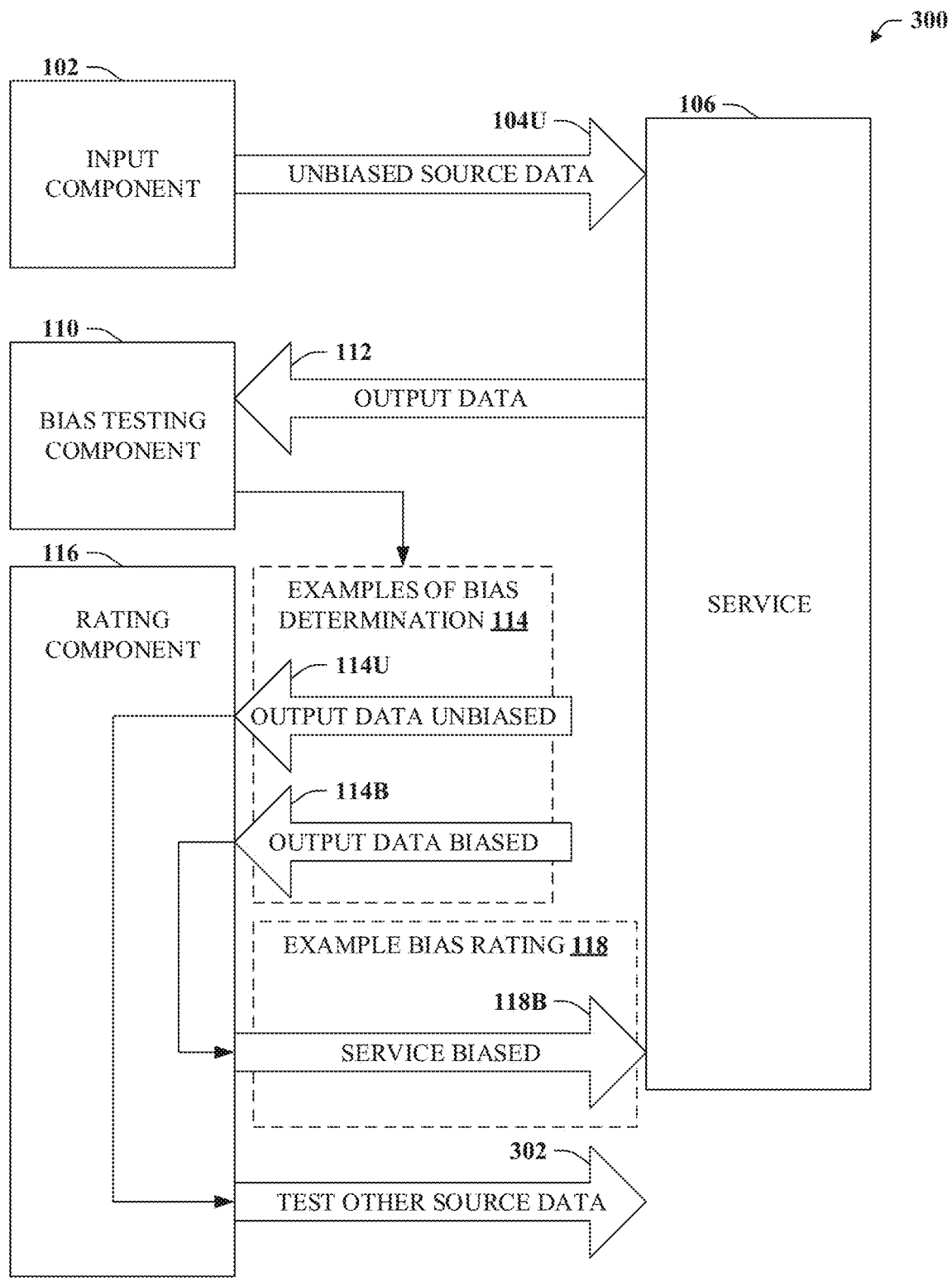
FIG. 3 illustrates a block diagram of an example system that can determine whether an indicator of bias is exhibited in response to unbiased source data being input to the service 106 in accordance with one or more embodiments.

Referring now to FIG. 3, system 300 is illustrated. System 300 can determine whether an indicator of bias is exhibited in response to unbiased source data being input to the service 106 in accordance with one or more embodiments. Repetitive description of like elements employed in other embodiments described herein is omitted for sake of brevity. In this example, which can be referred to as stage one testing, input component 102 provides to service 106 unbiased source data 104U. For example, the source data (e.g., source data 104) selected by data selection component 202 is unbiased according to bias specification 108. The resulting output data 112 can be examined by bias testing component 110 to yield bias determination 114 as detailed in connection with FIG. 1. As illustrated here, examples of bias determination 114 can include determination 114U that the output data 112 is unbiased. Another example is determination 114B that the output data 112 is biased.

In some embodiments, rating component 116 can assign a first rating to service 106. The first rating can indicate that service 106 is biased, which is illustrated by bias rating 118B. Rating component 116 can arrive at bias rating 118B, e.g., indicating that service 106 is biased, based on the source data 104 being unbiased and output data 112 being biased. Since in this case service 106 received unbiased source data 104U, but generated output data 112 that was determined to be biased, it can be presumed service 106 is biased and not merely perpetuating bias of source data 104. Hence, rating component 116 can generate bias rating 118B and, in that case, stage two testing is not necessary. In some embodiments, bias rating 118B can represent a poor rating, as such is indicative of service 106 being a source of bias, and other developers that rely on service 106 for their own applications should be aware of this danger.

On the other hand, suppose instead that bias testing component 110 generates bias determination 114U, indicating that the output data 112 is unbiased. In that case, rating component 116 can provide an indication that service 106 is not, strictly speaking, biased. In that case, an intermediate or other rating (e.g., bias rating 118) can be assigned and/or service 106 can undergo stage two testing to test with other source data, which is illustrated by reference numeral 302. Stage two testing is further detailed with reference to FIG. 4.

Figure 4:
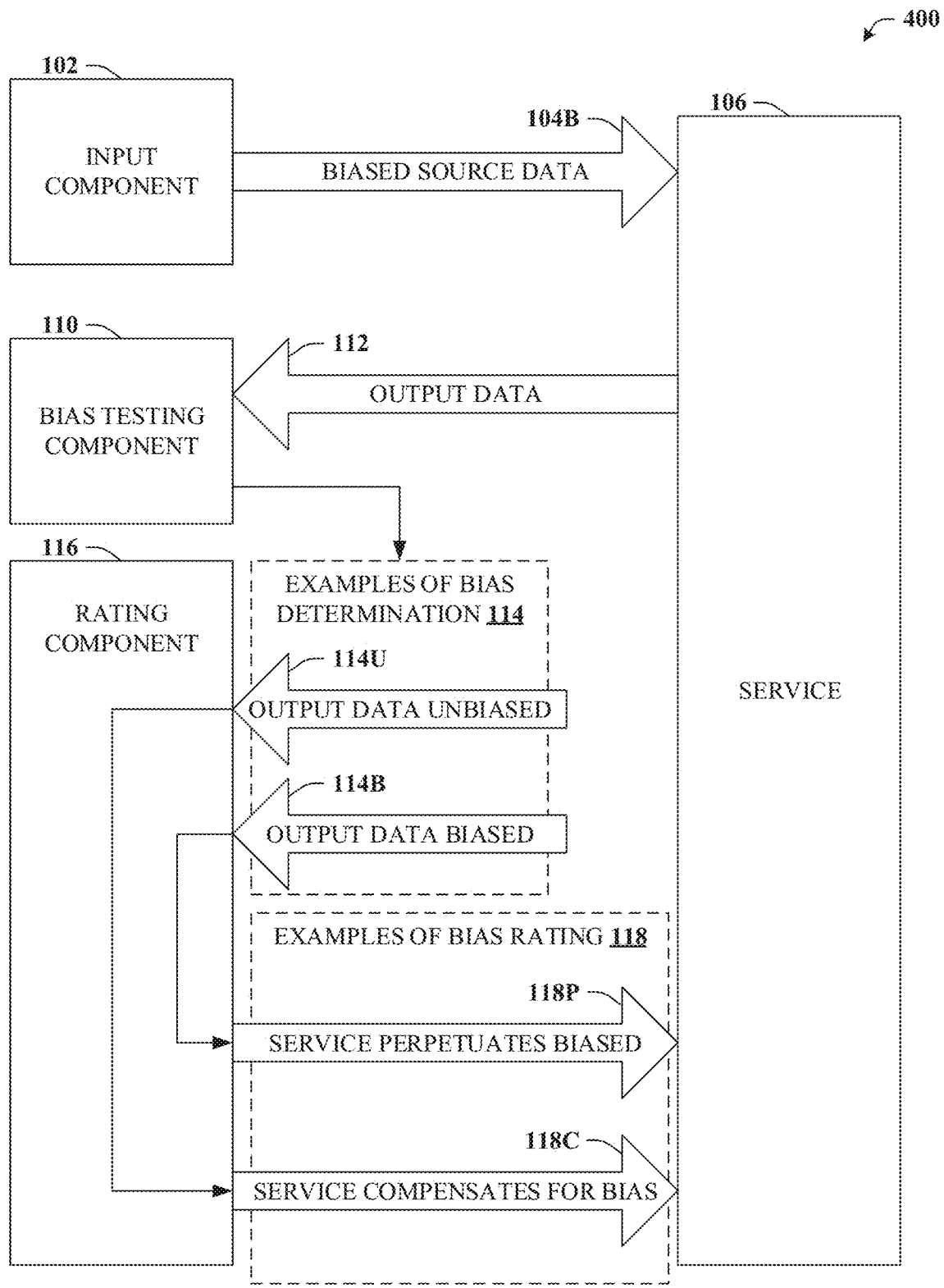
FIG. 4 illustrates a block diagram of an example system that can determine whether an indicator of anti-bias is exhibited in response to biased source data being input to the service in accordance with one or more embodiments.

Referring now to FIG. 4, system 400 is illustrated. System 400 can determine whether an indicator of anti-bias is exhibited in response to biased source data being input to the service 106 in accordance with one or more embodiments. Repetitive description of like elements employed in other embodiments described herein is omitted for sake of brevity. In this example, which can be referred to as stage two testing, input component 102 provides to service 106 biased source data 104B, as opposed to unbiased source data 104U that was provided in connection with FIG. 3 (e.g., stage one testing). Providing biased source data 104B can indicate that the source data (e.g., source data 104) selected by data selection component 202 is biased according to bias specification 108. The resulting output data 112 can be examined by bias testing component 110 to yield bias determination 114 as detailed in connection with FIG. 3. In other words, examples of bias determination 114 can include determination 114U that the output data 112 is unbiased. Another example is determination 114B that the output data 112 is biased.

Recall, it is known that source data 104 is biased source data 104B and further known as a result of stage one testing that service 106 has not been identified as biased, e.g., has not been assigned bias rating 118B. Based on the above, two outcomes are again possible: rating component 116 can generate bias rating 118P, indicating service 106 perpetuates the bias extant in biased source data 104B, or rating component 116 can generate bias rating 118C, indicating service 106 compensates for the bias extant in biased source data 104B.

As is evident, bias rating 118 can be a function of bias determination 114. In that regard, rating component 116 can assign bias rating 118P that indicate service 106 perpetuates bias that exists in biased source data 104B based on the source data 104 being biased (e.g., biased source data 104B) and output data 112 being biased. In other words, the input to service 106 is biased source data 104B and bias testing component generates bias determination 114B, indicating output data 112 is biased. Such can result in bias rating 118P, indicating service 106 perpetuates bias. In some embodiments, bias rating 118P can represent a medium or neutral rating, indicating that service 106 is not biased, but neither is service 106 anti-biased.

In a second case, rating component 116 can assign bias rating 118C that indicate service 106 compensates for bias that exists in biased source data 104B. Rating 118C can be based on the source data 104 being biased (e.g., biased source data 104B) and output data 112 being unbiased. In other words, the input to service 106 is biased source data 104B, yet bias testing component generates bias determination 114U, indicating output data 112 is unbiased. Such can result in bias rating 118C, indicating service 106 compensates for bias. In some embodiments, bias rating 118C can represent an excellent rating, indicating that service 106 is anti-biased. A service (e.g., service 106) determined to be anti-biased (e.g., bias rating 118C) can be very advantageous because decisions or output (e.g., output data 112) provided by that service can compensate for bias in source data. In some cases that can equate to compensating for bias of other services, which is further detailed in connection with FIG. 5.

Figure 5:
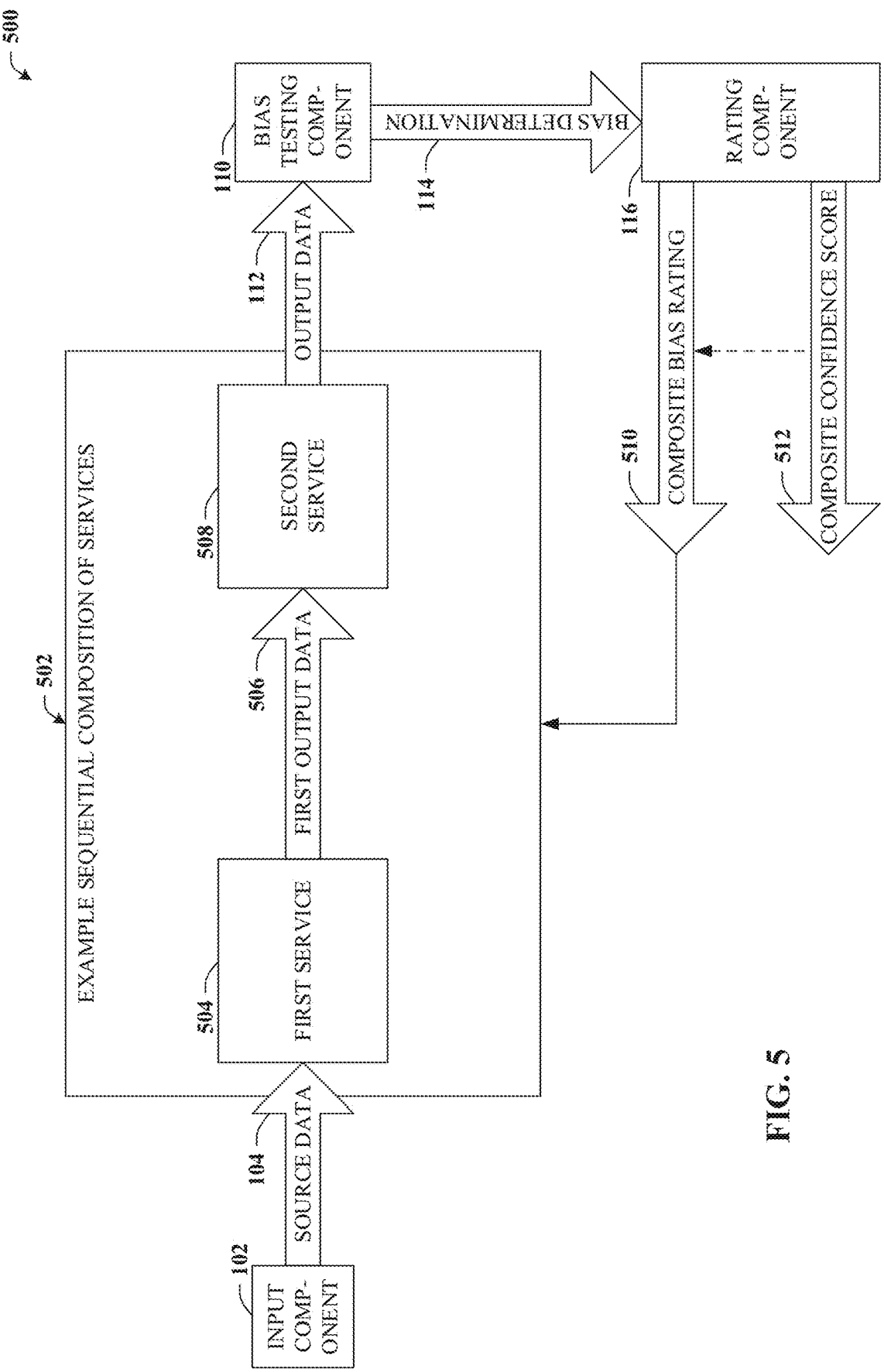
FIG. 5 depicts a block diagram of an example system illustrating an example of a sequential composition of services and a first example of determining a composite bias rating for the sequential composition of services in accordance with one or more embodiments.

Turning now to FIG. 5, system 500 is illustrated. System 500 illustrates an example of a sequential composition of services and a first example of determining a composite bias rating for the sequential composition of services in accordance with one or more embodiments. Repetitive description of like elements employed in other embodiments described herein is omitted for sake of brevity. A sequential composition of services, referred to herein as composition 502, can have multiple services in which output of preceding service in the sequence is provided as input to a subsequent service in the sequence. In this example, composition 502 comprises first service 504 that receives source data 104 that, when processed by first service 504, results in first output data 506. Composition 502 further comprises second service 508 that receives first output data 506 that, when processed by second service 508, results in output data 112. It is understood that while composition 502 illustrates a sequential composition of two services, composition 502 may comprise substantially any number of services.

To provide some concrete examples, consider a composition 502 whose task it is to generate a sentiment of an image. That task can be accomplished by sequentially composing two off-the-shelf services. For example, first service 504 can be a service that receives an image (e.g., source data 104) and generates text describing the image (e.g., first output 506). Second service 508 can be a service that receives text (e.g., first output 506) and generates a sentiment (output data 112) that is either positive or negative.

As another example, consider a composition 502 whose task it is to generate a multi-lingual caption of an image, which is again accomplished by sequentially composing two off-the-shelf services. In this case, first service 504 can be a service that receives an image (e.g., source data 104) and generates text describing the image (e.g., first output 506). Second service 508 can be a service that receives text (e.g., first output 506) and generates text in another language (output data 112).

In either case, bias testing component 110 can receive output data 112 generate bias determination 114. Similar to that described in connection with FIGS. 1-4. Likewise, rating component 116 compose a composite bias rating 510 in a manner similar to generating bias rating 118 detailed in connection with FIGS. 1-4 as well as composite confidence score 512. It is appreciated that determining composite bias rating 510 in this manner does have some shortcomings. For example, composition bias rating 510 is likely not conclusive with respect to bias or anti-bias of the individual services, but rather only with respect to that particular sequential composition of services. Such may lead to confusion or incorrect assumptions. As another example, this manner of determining bias rating 510 may be unnecessary and thus inefficient in terms of resource utilization or the like. In that regard, composite bias rating 510 may be determined based on bias ratings 118 of individual members of composition 502, which is further detailed with reference to FIG. 6.

Figure 6:
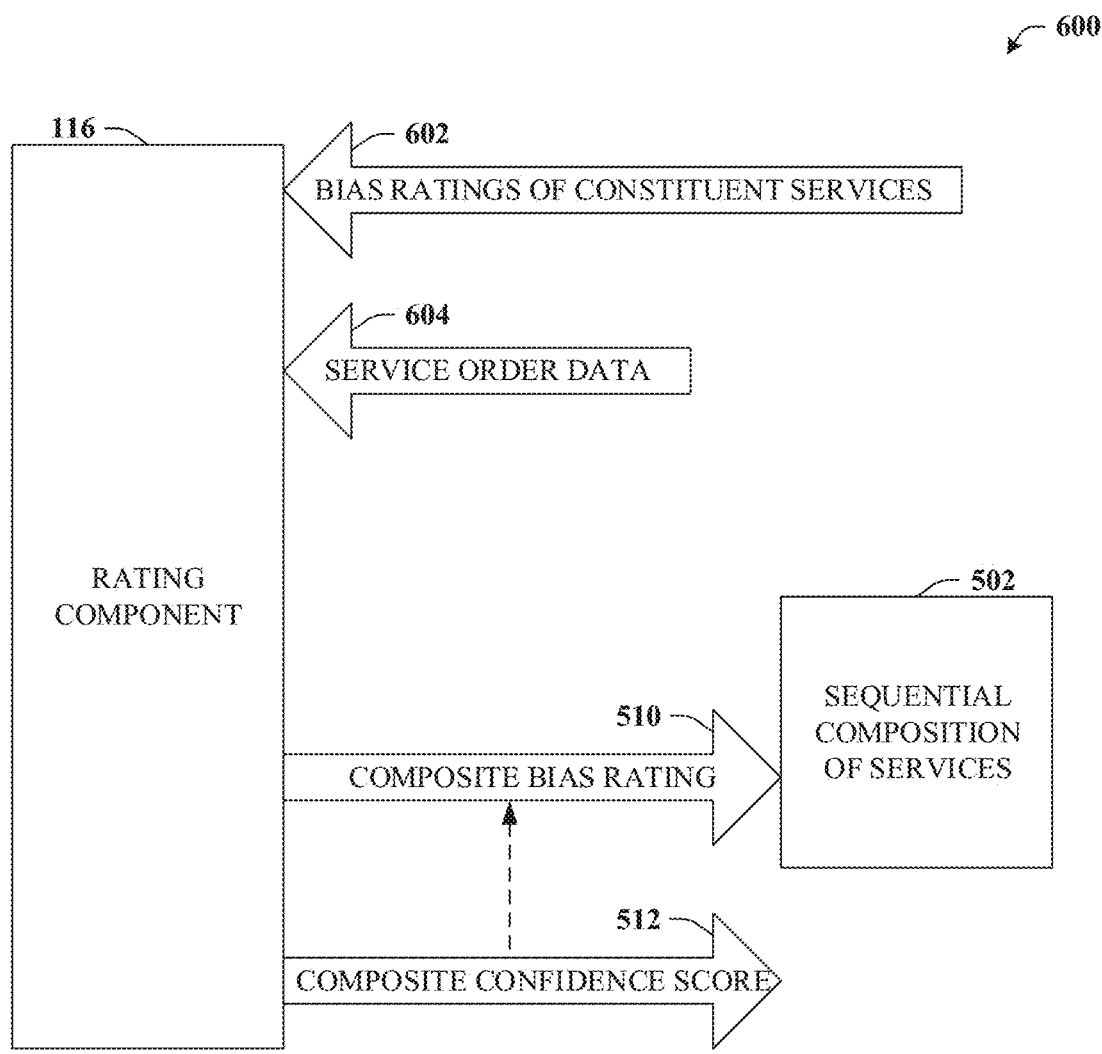
FIG. 6 depicts a block diagram of an example system illustrating a second example of determining a composite bias rating for the sequential composition of services in accordance with one or more embodiments.

Referring now to FIG. 6, system 600 is depicted. System 600 illustrates a second example of determining a composite bias rating for the sequential composition of services in accordance with one or more embodiments. Repetitive description of like elements employed in other embodiments described herein is omitted for sake of brevity. In this case, composite bias rating 510 and likewise composite confidence score 512 can be determined without actively testing composition 502 in the manner described above. In other words, composite bias rating 510 can be determined based on respective bias ratings 118 of constituent services (e.g., first service 504, second service 508, etc) of the sequential combination of services (e.g., composition 502). In many cases, those ratings may have been previously determined and readily discovered, but regardless, receipt of bias ratings of constituent services (whether looked up or newly determined) is illustrated by reference numeral 602. In some embodiments, rating component 116 can determine composite bias rating 510 further based on an order the constituent services within the sequential composition of services, which is illustrated by service order data 604.

To provide a concrete illustration, consider the case in which first service 504 has a bias rating 118B, indicating that first service 504 introduces bias. However, second service 508 has a bias rating 118C, indicating that second service 508 compensates for bias. As indicated by service order data 604, second service 508 follows first service 504 in the sequence. Thus, second service 508 can compensate for bias introduce (or perpetuated) by first service 504, and rating component 116 can assign a composite bias rating 510 that indicates composition 502 is UCS or similar.

But further consider the case in which the order is reversed. That is, first service 504 has a bias rating of 118C, indicating that first service 504 compensates for bias and second service 508 has a bias rating of 118B, indicating that second service 508 introduces bias. In that case, one service of composition 502 is no longer capable of compensating for the bias introduced by the other service. Hence, composite bias rating 510 can indicate that composition 502 is biased, given that second service 508, which generates output data 112 has a bias rating of 118B.

Figure 7:
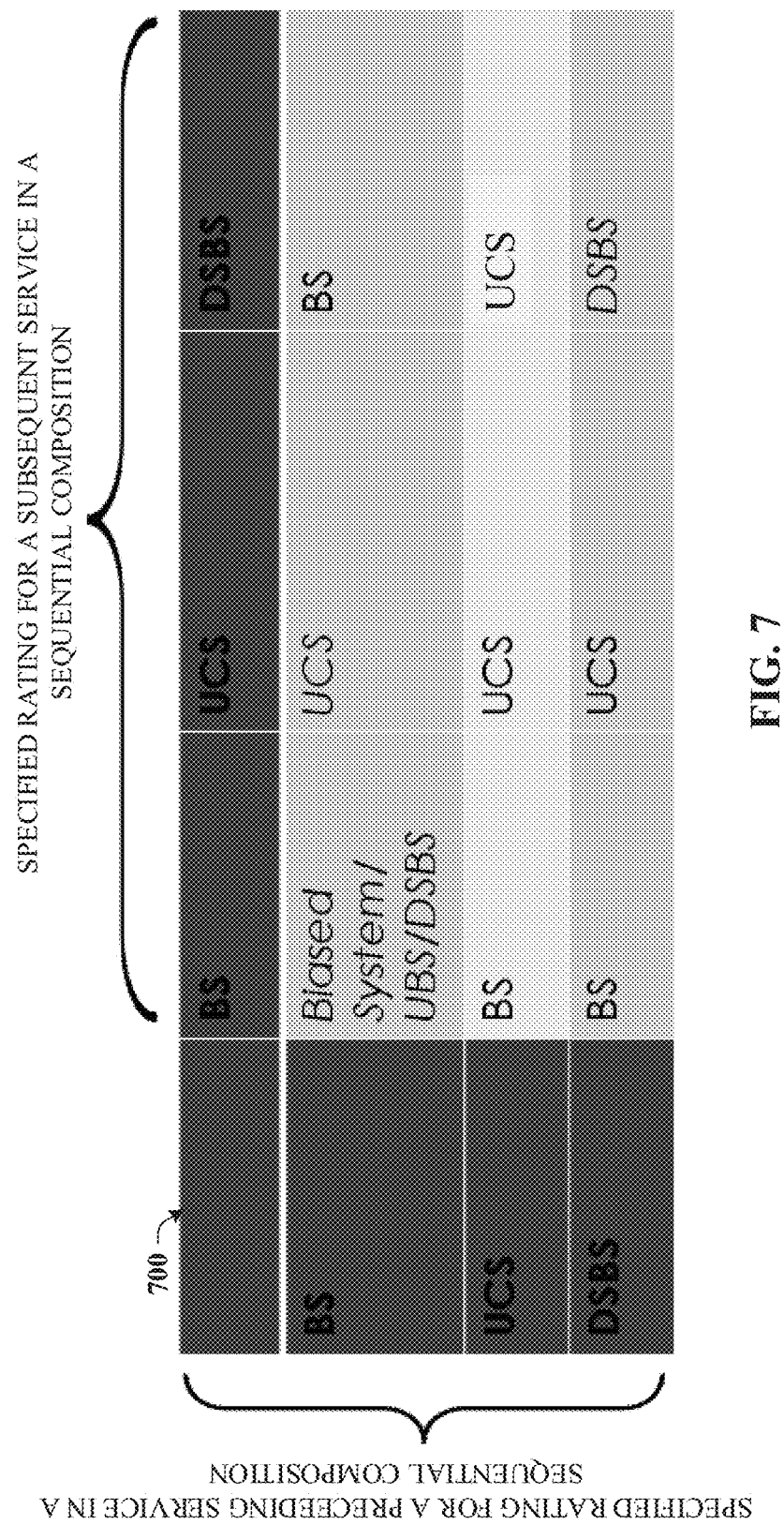
FIG. 7 illustrates a chart that can provide a quick reference lookup for determining a composite bias rating based on respective bias ratings and order of individual services of a sequential composition of services in accordance with one or more embodiments.

FIG. 7 depicts chart 700. Chart 700 provides a quick reference lookup for determining a composite bias rating based on respective bias ratings and order of individual services of a sequential composition of services in accordance with one or more embodiments. Repetitive description of like elements employed in other embodiments described herein is omitted for sake of brevity. The first column of chart 700 represents a bias rating (e.g., bias rating 118) of a preceding service in a sequential composition of services. The first row of chart 700 represents a bias rating of a subsequent service in a sequential composition of services.

In the case of composition 502, first service 504 is a preceding service and second service 508 is a subsequent service because the output of first service 504 (e.g., first output 506) is input to second service 508, which can be determined based on service order data 604. It is understood that in other examples of composition 502 comprises a third service might exist that follows second service 508 in the sequence of the composition (e.g., receives as input the output of second service 508). In that case, second service 508 can be a subsequent service with respect to first service 504, but a preceding service with respect to the third service for the purposes of using chart 700.

It is noted that in a case where both the preceding service and the subsequent service are biased (e.g., bias rating is BS or similar), as illustrated at the intersection of column two and row two of chart 700, a result may be non-deterministic and output may be any one of BS, DSBS, or UCS. In that case, the first example of determining composite bias rating 510 detailed in connection with FIG. 5 might be preferred. It is further noted that a subsequent service with a UCS rating will compensate for bias of a preceding service. Thus, when selecting services, a consumer desiring to avoid bias can do so even with services that are known to be biased, provided that a subsequent service is UCS, which can greatly increase consumer options while still satisfying the goal of mitigating bias.

Figure 8:
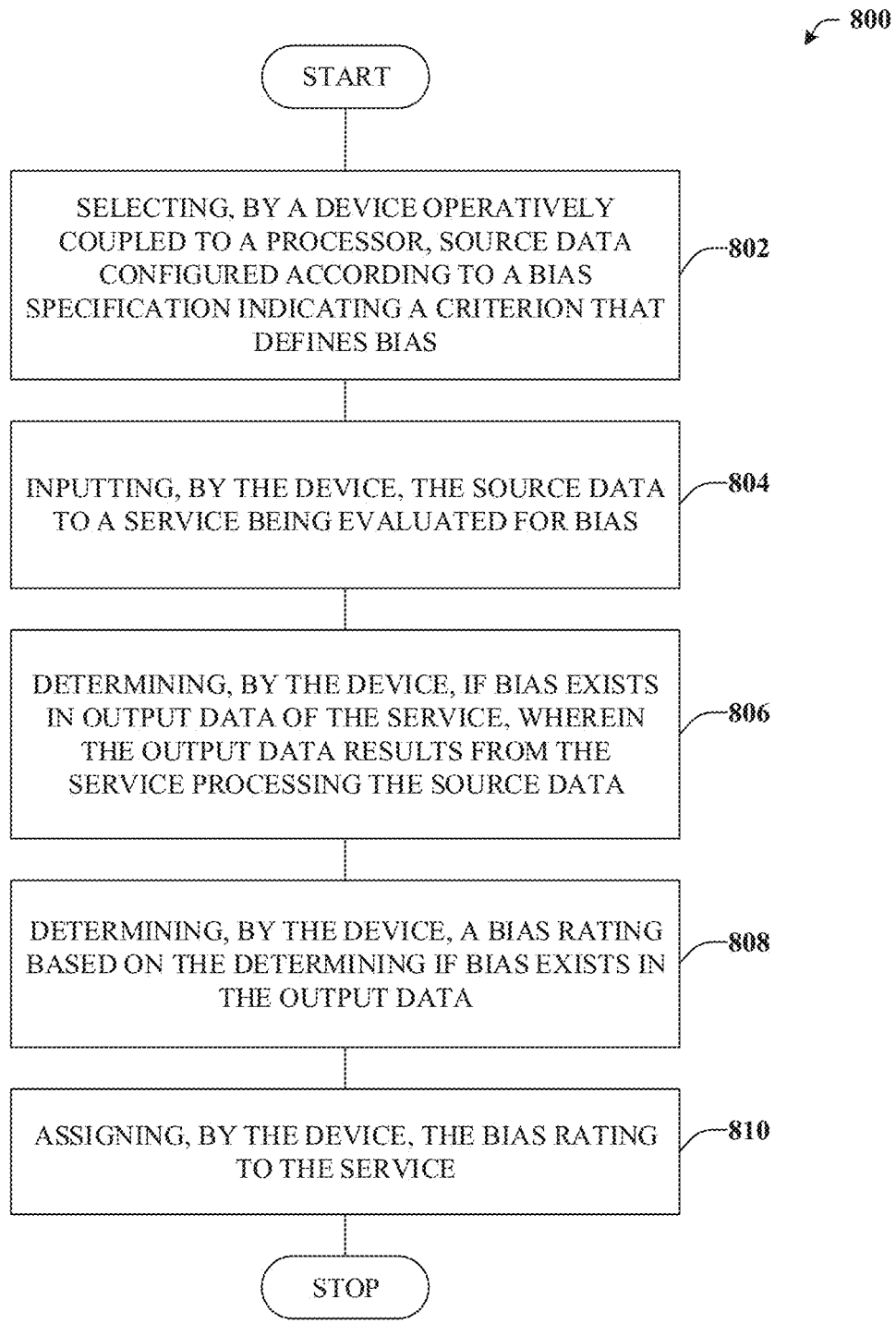
FIG. 8 illustrates a flow diagram of an example, non-limiting computer-implemented method that can assign a bias rating to a service based on bias or anti-bias testing of the service in accordance with one or more embodiments.
Figure 9:
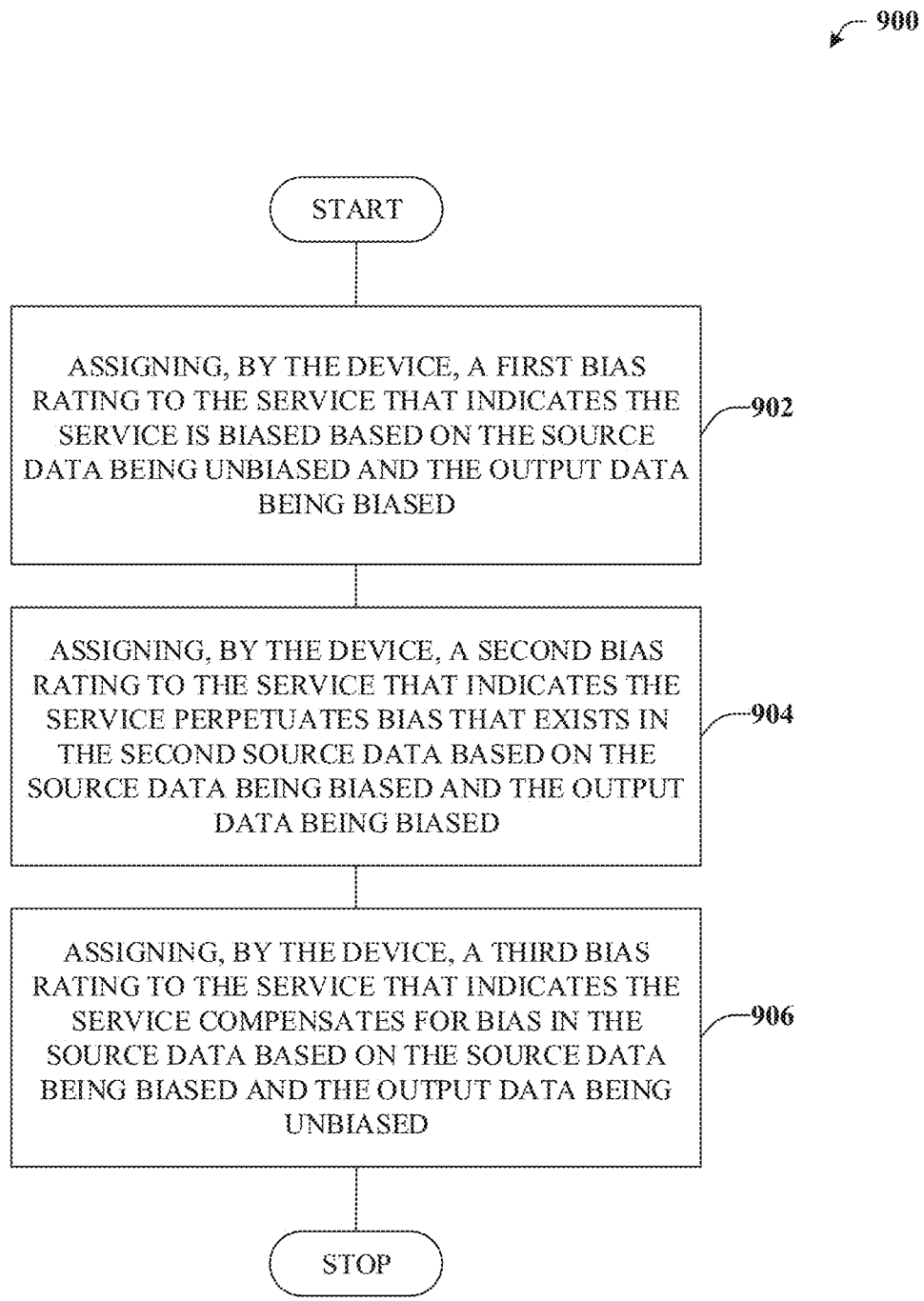
FIG. 9 illustrates a flow diagram of an example, non-limiting computer-implemented method that can provide for additional aspects or elements in connection with assigning the bias rating in accordance with one or more embodiments.

FIGS. 8 and 9 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

FIG. 8 illustrates a flow diagram 800 of an example, non-limiting computer-implemented method that can assign a bias rating to a service based on bias or anti-bias testing of the service in accordance with one or more embodiments. Repetitive description of like elements employed in other embodiments described herein is omitted for sake of brevity. At reference numeral 802, a device (e.g., system 200) operatively coupled to a processor can select source data configured according to a bias specification indicating a criterion that defines bias. In some embodiments, the device can select the source data from a repository of candidate source data. In some embodiments, the device can generate new data and select the newly generated data as the source data. In some embodiments, the device can, in some instances, select source data that is unbiased according to the bias specification. In some embodiments, the device can, in other instances, select source data that is biased according to the bias specification.

At reference numeral 804, the device can input the source data to a service being evaluated for bias. Thus, if, at reference numeral 802, unbiased data was selected, then unbiased data can be input to the service being evaluated for bias. Otherwise, if at reference numeral 802, biased data was selected, then biased data can be input to the service being evaluated.

At reference numeral 806, the device can determine if bias exists in output data of the service. Output data can be that output of the service that results from the service processing the source data. For example, if bias does exist in the output data a first bias determination can be determined, while a second bias determination can be determined if bias does exist in the output data.

At reference numeral 808, the device can determine a bias rating based on the determining if bias exists in the output data indicated at reference numeral 806. At reference numeral 810, the device can assign the bias rating determined at reference numeral 808 to the service. It is understood that various bias ratings can be assigned, and further that such can be, in some embodiments, determined based on whether the source data is biased versus unbiased in combination with whether the output data is biased versus unbiased, which is further detailed in connection with FIG. 9.

Turning now to FIG. 9, illustrated is a flow diagram 900 of an example, non-limiting computer-implemented method that can provide for additional aspects or elements in connection with assigning the bias rating in accordance with one or more embodiments. Repetitive description of like elements employed in other embodiments described herein is omitted for sake of brevity. At reference numeral 902, the device (e.g., rating component 116 of systems 100 or 200) can assign a first bias rating to the service that indicates the service is biased based on the source data being unbiased and the output data being biased.

At reference numeral 904, the device (e.g., rating component 116 of systems 100 or 200) can assign a second bias rating to the service that indicates the service perpetuates bias that exists in the second source data based on the source data being biased and the output data being biased.

At reference numeral 906, the device (e.g., rating component 116 of systems 100 or 200) can assign a third bias rating to the service that indicates the service compensates for bias in the source data based on the source data being biased and the output data being unbiased.

It is understood that the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create ways for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 10, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 10:
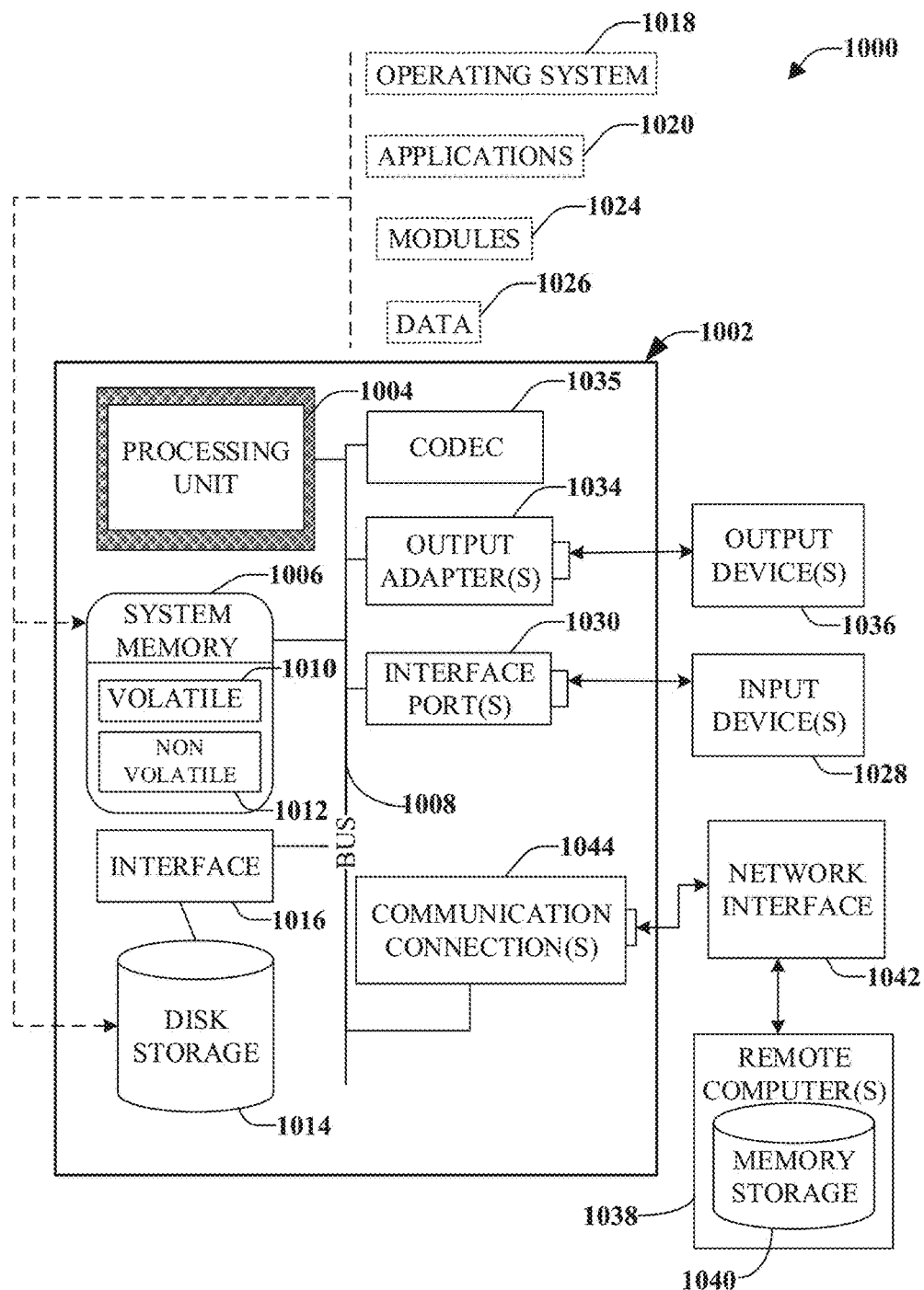
FIG. 10 illustrates a block diagram of an example, non-limiting operating environment in which one or more embodiments described herein can be facilitated.

With reference to FIG. 10, an example environment 1000 for implementing various aspects of the claimed subject matter includes a computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 includes volatile memory 1010 and non-volatile memory 1012, which can employ one or more of the disclosed memory architectures, in various embodiments. The basic input/output system (BIOS), containing the basic routines to transfer information between elements within the computer 1002, such as during start-up, is stored in non-volatile memory 1012. In addition, according to present innovations, codec 1035 can include at least one of an encoder or decoder, wherein the at least one of an encoder or decoder can consist of hardware, software, or a combination of hardware and software. Although, codec 1035 is depicted as a separate component, codec 1035 can be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1012 can employ one or more of the disclosed memory devices, in at least some embodiments. Moreover, non-volatile memory 1012 can be computer memory (e.g., physically integrated with computer 1002 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1010 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1002 can also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD), flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016. It is appreciated that storage devices 1014 can store information related to a user. Such information might be stored at or provided to a server or to an application running on a user device. In one embodiment, the user can be notified by way of output device(s) 1036) of the types of information that are stored to disk storage 1014 or transmitted to the server or application. The user can be provided the opportunity to opt-in or opt-out of having such information collected or shared with the server or application (e.g., by way of input from input device(s) 1028).

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port can be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a way of connection between the output device 1036 and the system bus 1008. It should be noted that other devices or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other embodiments to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR- RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components;
a processor that executes the computer executable components stored in the memory, wherein the computer executable components comprise:
a bias testing component that performs bias testing on a computer service based on a bias specification representing a criterion that defines bias, wherein the bias testing comprises two stages comprising a first stage that determines whether the computer service introduces the bias given unbiased input, and a second stage that determines whether the computer service compensates for the bias when given biased input,
where the first stage comprises:
select a first source data based on the bias specification, wherein the first source data is determined to be unbiased according to the bias specification;
initiate a first execution of the computer service by inputting the first source data to the computer service resulting in first output data, and
where the second stage comprises:
select a second source data based on the bias specification, wherein the second source data is determined to be biased according to the bias specification;
initiate a second execution of the computer service by inputting the second source data to the computer service resulting in second output data; and
a rating component that assigns a bias rating to the computer service based on a determination of whether the bias exists in at least one of the first set of output data or the second output data.

2. The system of claim 1, wherein the rating component assigns the bias rating to the computer service in response to determining that the bias exists in the first output data, wherein the bias rating is indicative that the computer service introduces the bias.

3. The system of claim 1, further comprising a data selection component that generates at least one of the first source data or the second source data based on the bias specification.

4. The system of claim 1, wherein the rating component assigns the bias rating to the computer service in response to determining that the bias does not exist in the first output data, wherein the bias rating is indicative that the computer service does not introduce the bias.

5. The system of claim 1, wherein the rating component assigns the bias rating to the computer service in response to determining that the bias exists in the second output data, wherein the bias rating is indicative that the computer service perpetuates the bias.

6. The system of claim 1, wherein the rating component assigns the bias rating to the computer service in response to determining that the bias does not exist in the second output data, wherein the bias rating indicates the computer service compensates for the bias.

7. The system of claim 1, wherein the bias testing component determines that at least one of the first output data or the second output data does not comprise the bias based on respective distributions of attribute values of the at least one of the first output data or the second output data being within a defined difference of a baseline distribution of the attribute values.

8. The system of claim 1, wherein the rating component assigns to the bias rating a confidence score that indicates a level of confidence that the bias rating is accurate.

9. The system of claim 1, wherein the computer service is a first computer service, and wherein the rating component assigns a composite bias rating to a sequential composition of computer services comprising the first computer service that produces the first output data, and a second computer service that receives the first output data that, when processed by the second computer service, results in third output data.

10. The system of claim 9, wherein the rating component determines the composite bias rating based on respective bias ratings of the computer services of the sequential composition of computer services and an order of the computer services within the sequential composition of computer services.

11. A computer program product for determining a bias rating of a computer service, the computer program product comprising a computer readable storage medium having program instructions embodied therewith, the program instructions executable by a processor to cause the processor to:
perform, by the processor, bias testing on the computer service based on a bias specification representing a criterion that defines bias, wherein the bias testing comprises two stages comprising a first stage that determines whether the computer service introduces the bias given unbiased input, and a second stage that determines whether the computer service compensates for the bias when given biased input,
where the first stage comprises:
select a first source data based on the bias specification, wherein the first source data is determined to be unbiased according to the bias specification;
initiate a first execution of the computer service by inputting the first source data to the computer service resulting in first output data, and where the second stage comprises:
  select a second source data based on the bias specification, wherein the second source data is determined to be biased according to the bias specification;
  initiate a second execution of the computer service by inputting the second source data to the computer service resulting in second output data; and
assign, by the processor, the bias rating to the computer service based on a determination of whether the bias exists in at least one of the first output data or the second output data.

12. The computer program product of claim 11, wherein the bias rating indicates the computer service introduces the bias based on determining that the bias exists in the first output data.

13. The computer program product of claim 11, wherein the bias rating indicates the computer service does not introduce the bias based on determining that the bias does not exist in the first output data.

14. The computer program product of claim 11, wherein the bias rating indicates the computer service perpetuates the bias based on determining that the bias exists in the second output data.

15. A computer-implemented method, comprising:
performing, by a device operatively coupled to a processor, bias testing on a computer service based on a bias specification representing a criterion that defines bias, wherein the bias testing comprises two stages comprising a first stage that determines whether the computer service introduces the bias given unbiased input, and a second stage that determines whether the computer service compensates for the bias when given biased input,
where the first stage comprises:
  selecting a first source data based on the bias specification, wherein the first source data is determined to be unbiased according to the bias specification;
  initiating a first execution of the computer service by inputting the first source data to the computer service resulting in first output data, and
where the second stage comprises:
  select a second source data based on the bias specification, wherein the second source data is determined to be biased according to the bias specification;
  initiate a second execution of the computer service by inputting the second source data to the computer service resulting in second output data; and
assigning, by the device, a bias rating to the computer service based on determining whether the bias exists in at least one of the first output data or the second output data.

16. The computer-implemented method of claim 15, wherein the bias rating indicates the computer service introduces the bias based on determining that the bias exists in the first output data.

17. The computer-implemented method of claim 15, wherein the bias rating indicates the computer service does not introduce the bias based on determining that the bias does not exist in the first output data.

18. The computer-implemented method of claim 15, wherein the bias rating indicates the computer service perpetuates the bias based on determining that the bias exists in the second output data.

19. The computer-implemented method of claim 15, wherein the bias rating indicates the computer service compensates for the bias based on determining that the bias does not exist in the second output data.

20. The computer program product of claim 11, wherein the bias rating indicates the computer service compensates for the bias based on determining that the bias does not exist in the second output data.

* * * * *